United States Patent [19]

Pape

[11] Patent Number: 4,819,059
[45] Date of Patent: Apr. 4, 1989

[54] SYSTEM AND METHOD FOR FORMATTING A COMPOSITE STILL AND MOVING IMAGE DEFINING ELECTRONIC INFORMATION SIGNAL

[75] Inventor: David D. Pape, Framingham, Mass.

[73] Assignee: Polaroid Corporation, Cambridge, Mass.

[21] Appl. No.: 120,592

[22] Filed: Nov. 13, 1987

[51] Int. Cl.$^4$ .................. H04N 7/08; H04N 11/06
[52] U.S. Cl. ..................... 358/12; 358/146; 358/41; 358/909; 358/310; 358/312
[58] Field of Search ............ 358/12, 16, 146, 310, 358/312, 21 R, 41, 909, 50; 360/10.1, 11.1, 18, 35.1

[56] References Cited

U.S. PATENT DOCUMENTS

| | | | |
|---|---|---|---|
| 3,372,228 | 3/1968 | Law .................... | 358/138 |
| 3,715,483 | 2/1973 | Limb et al. .......... | 358/133 |
| 3,745,240 | 7/1973 | Marchand et al. .. | 358/146 |
| 3,887,763 | 6/1975 | Hinoshita ............ | 358/133 |
| 3,969,581 | 7/1976 | Watatani et al. .... | 358/335 |
| 4,009,331 | 2/1977 | Goldmark et al. .. | 358/310 |
| 4,027,333 | 5/1977 | Kaiser et al. ........ | 358/146 |
| 4,287,539 | 9/1981 | Bixby et al. ......... | 360/18 |
| 4,541,010 | 9/1985 | Alston ................. | 358/909 |
| 4,546,390 | 10/1985 | Konishi et al. ...... | 360/10.3 |
| 4,604,668 | 8/1986 | Lemelson ............ | 360/10.1 |
| 4,660,096 | 4/1987 | Arlan et al. ......... | 360/35.1 |
| 4,691,253 | 9/1987 | Silver .................. | 360/33.1 |
| 4,694,357 | 9/1987 | Rahman et al. ..... | 360/9.1 |
| 4,740,828 | 4/1988 | Kinoshita ............ | 358/44 |
| 4,760,469 | 7/1988 | Biber et al. .......... | 360/35.1 |

FOREIGN PATENT DOCUMENTS 26621   3/1978   Japan ......................... 358/12

OTHER PUBLICATIONS

Dill, High Resolution NTSC Television System, IBM Technical Disclosure Bulletin, vol. 21, No. 5, Oct. 1978, pp. 2148-2153.

*Primary Examiner*—John W. Shepperd
*Attorney, Agent, or Firm*—Edward S. Roman

[57] ABSTRACT

A system and method for formatting a composite still and moving image defining electronic information signal by interspersing a high resolution still image defining electronic information signal in alternate fields with a moving image defining electronic information signal such that a plurality of succeeding alternate still image defining fields collectively define a single high resolution still image. The system and method also operates to deformat the composite still and moving image defining electronic information signal by first separating the moving and still image defining electronic information signals from each other and thereafter interpolating a second field from each first field of each frame of moving image defining electronic information signals to enable the display of a continuous moving image without interruption. The plurality of succeeding alternate frames of high resolution still image defining electronic information signals are also combined to enable the display of a high resolution still image.

15 Claims, 8 Drawing Sheets

SYSTEM AND METHOD FOR FORMATTING A COMPOSITE STILL AND MOVING IMAGE DEFINING ELECTRONIC INFORMATION SIGNAL

BACKGROUND OF THE INVENTION

1. Field of the Invention

This invention relates generally to a system and method for formatting and subsequently deformatting moving and still image information and, more particularly, to a system and method of formatting and deformatting moving image defining electronic information signals interspersed with still image defining electronic information signals.

2. Description of the Prior Art

Electronic video cameras for recording motion pictures on magnetic tape are well known in the art and are in common usage today. Such cameras are designed for home use to record motion pictures on magnetic tape. Such moving picture video cameras do not have the capability of recording still images; and, although playback can be paused to provide a single still frame image, such paused images are generally low quality and do not provide a satisfactory still image of the subject.

Electronic imaging cameras for recording still images have also been proposed. Such cameras can record a plurality of still images on a single magnetic disk or tape in either analog or digital format for subsequent playback on any well-known cathode ray tube viewing device. Such still images which may be recorded in high resolution are of a higher quality than the single still frame images that can be provided by pausing a motion picture video tape to display a single frame. Although such electronic imaging still cameras can provide highly satisfactory still images, such cameras cannot be operated in a continuous video mode to provide moving images.

Most recently, electronic imaging cameras have been proposed which provide the camera operator with the choice of recording either continuous video motion pictures or selected still images as disclosed in U.S. Pat. No. 4,691,253 entitled "Electronic Imaging Camera for Recording Either Moving or Still Images", by Bruce R. Silver, issued Sept. 1, 1987. Unless the high resolution still image electronic information signals are recorded on a separate media or track from the moving image electronic information signals, there is provided an interruption of the moving image defining electronic information signals and, hence, the moving image derived therefrom each time a high resolution still image is recorded. Since a plurality of succeeding frames may be required to record a satisfactory high resolution still image, interspersing the succeeding frames of still image data with the moving image frames results in corresponding interruptions of the moving image during playback. Although these interruptions are generally of short duration, they may nevertheless be objectionable to the viewer of the moving image particularly if a large number of still images have been interspersed with the moving images along the length of the recording media.

Therefore, it is a primary object of this invention to provide a system and method for formatting and deformatting moving images and high resolution still images in a manner whereby the moving images may be replayed continuously without interruptions.

It is a further object of this invention to provide a system and method for formatting high resolution still image defining electronic information signals in interspersed fashion with moving image defining electronic information signals and thereafter deformatting such interspersed high resolution still image and moving image electronic information signals in a manner whereby moving images and still images may be simultaneously displayed without interfering or interrupting effects from each other.

Other objects of the invention will in part be obvious and will in part appear hereinafter. The invention accordingly comprises a mechanism and system possessing the construction, combination of elements and arrangement of parts which are exemplified in the following detailed disclosure.

SUMMARY OF THE INVENTION

A system and method is provided for formatting high resolution still image electronic information signals and moving image electronic information signals of a type which can be provided from an image sensor at standard video frame and field rates for integration with respect to each other. The system comprises means for receiving the moving image electronic information signals from the sensor at the standard video frame and field rate. Means are provided for storing each succeeding frame of the received moving image electronic information signals. Means thereafter encode the received moving image electronic information signals into a standard video format and output the encoded moving image electronic information signals at the standard video frame and field rate. Control means responsive to the selective actuation thereof operate to cause the encoding and output means to output only alternate fields of the encoded moving image electronic information signals. The control means also operates to output from the storage means select portions of the frame of electronic information signals stored by the storing means subsequent to the selective actuation at intervals corresponding to the intervals between the alternate fields of the encoded moving image electronic information signals. The select portions collectively comprise still image electronic information signals which define a high resolution still image.

A system and method is also provided for deformatting the composite electronic image information signals of the aforementioned type in which moving and still image electronic information signals are alternately recorded in succeeding segments and each of the succeeding moving image segments correspond, respectively, to a first field for each of a plurality of succeeding frames and each of the succeeding still image segments correspond to a succeeding portion of at least one frame of still image defining electronic information signals. The system comprises means for receiving the composite electronic image information signals and separating the moving and still image defining electronic information signals therefrom. Means are provided for storing the separated moving image electronic information signals from each one of the succeeding segments corresponding, respectively, to the first field for each of the plurality of succeeding frames. Means interpolate from each of the stored electronic information signals for each field moving image electronic information signals corresponding to a second field for each of a plurality of succeeding frames. The stored and interpolated moving image electronic information signals collectively define succeeding frames of moving image electronic information signals. Means are provided for storing the portions of the still image electronic information signals from the still image segments to provide a complete frame of still image defining electronic information signals.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Figure 1:
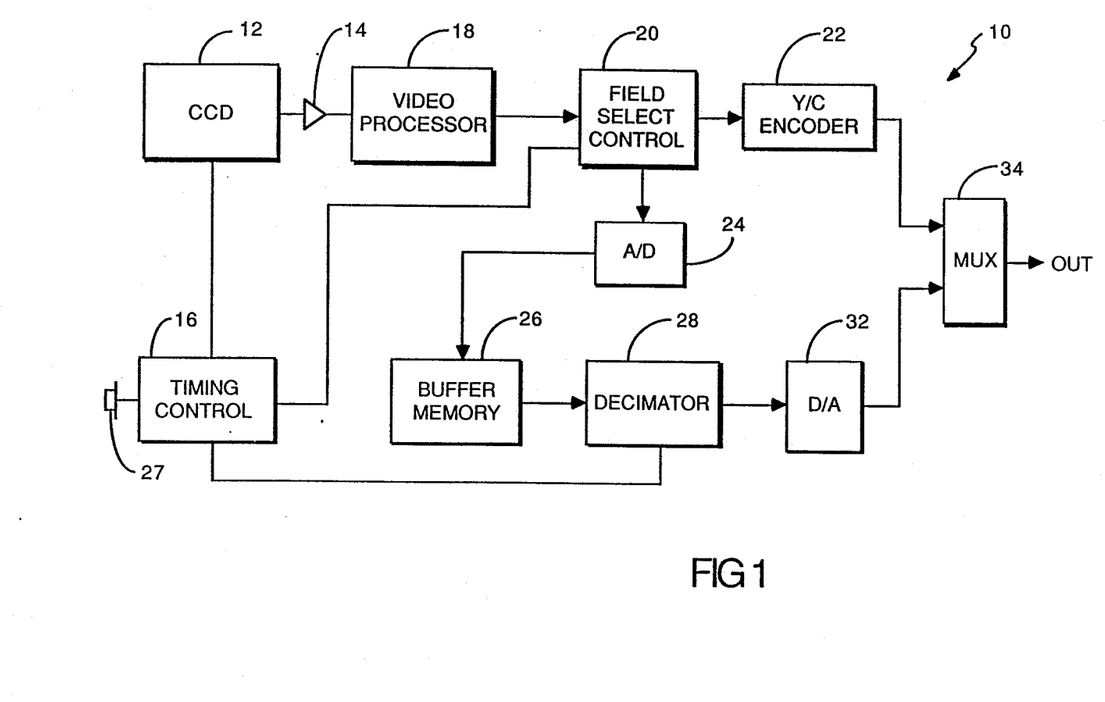
FIG. 1 is a schematic block diagram of the formatting circuit of this invention.
Figure 2:
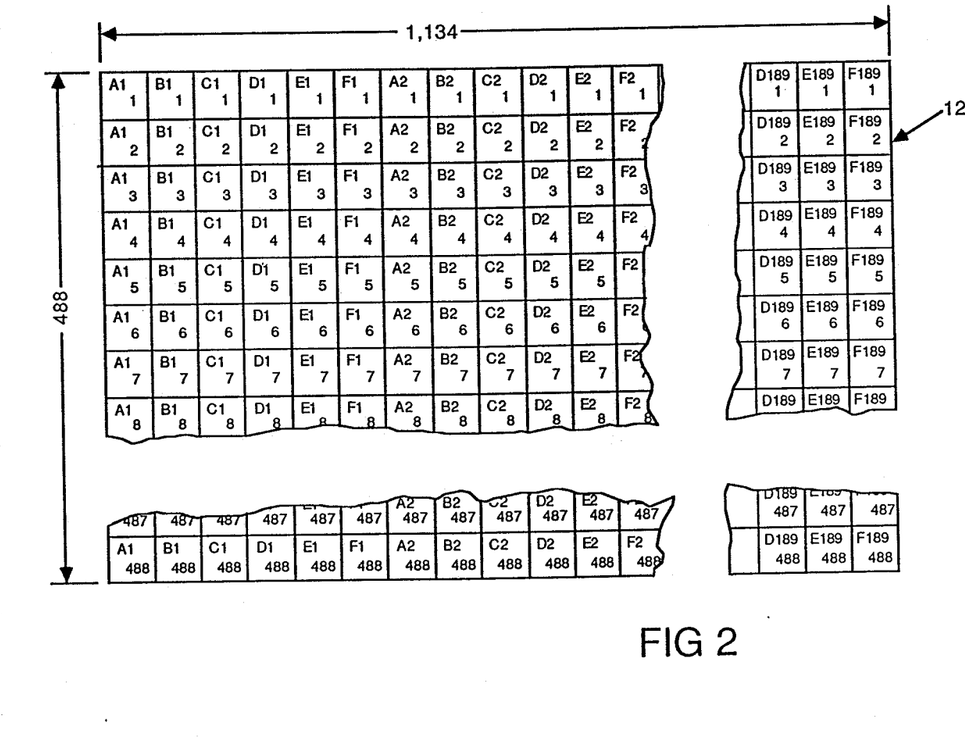
FIG. 2 is a fragmented plan view of a light sensing array as used in the circuit of FIG. 1.

Referring now to FIG. 1, there is shown generally at 10 a schematic block diagram for the video signal formatting circuit of this invention which may be utilized in an electronic imaging camera. A two-dimensional photosensitive area array 12 preferably comprising a high resolution charge-coupled device (CCD) receives image scene light in a well-known manner by way of an objective lens and shutter both of which are not shown. The image sensing array 12 comprises a plurality of image sensing elements or pixels arranged in a two-dimensional area array as best shown in FIG. 2 wherein each image sensing pixel converts the incident image defining scene light rays into a corresponding analog voltage value. Referring to FIG. 2 it can be seen that the image sensing pixels are arranged in columns denoted by the letters and numerals A1, B1, C1, D1, E1, F1 through A189, B189, C189, D189, E189 and F189. Thus, in total there are 1,134 columns or image sensing elements per row. The row of the image sensing array 12 are denoted, respectively, by the subscripts 1–488 thereby showing an image sensing array comprising 1,134 columns by 488 rows of image sensing elements or pixels.

The analog voltage values of the image sensing elements or pixels of the array 12 are serially transferred out of the image sensing array 12 in a conventional manner at standard video frame and field rates by timing clock pulses provided from a timing control 16. The image defining electronic information signals output from the sensing array 12 are subsequently transferred by way of an amplifier 14 to a video signal processing circuit 18 wherein the image defining electronic information signals are amplified and filtered in a well-known manner. The image defining electronic information signals are thereafter transferred by way of a field select control circuit 20 which operates in the manner of this invention to be subsequently described to a luminance/chrominance encoder circuit 22 wherein the image defining electronic information signals are encoded in a standard luminance and chrominance format. The luminance/chrominance encoded electronic information signals are thereafter directed by way of a multiplexing circuit 34 for recording on any conventional media such as video tape, magnetic disk, optical disk, etc. The field select circuit 20 also operates to transfer each frame of the image defining electronic information signals by way of an analog-to-digital converter 24 for storage in a buffer memory 26. Thus, in this manner each succeeding frame of image defining electronic information signals is stored in the buffer memory 26 for reasons which will become apparent from the following discussion.

The video signal formatting circuit 10 of this invention is intended for use in electronic imaging cameras of the type which as previously discussed record both moving and still images. The still images preferably are recorded at a substantially higher resolution than the moving images. Normal operation commences by continuously sensing incident scene light with the image sensing array 12 and serially transferring the image defining electronic information signals from the image sensor 12 in the aforementioned well-known manner at standard video frame and field rates. Since the image defining incident scene light is continuously sensed, the image sensor 12 provides so-called moving image defining electronic information signals which are subsequently amplified by the amplifier 14 and processed by the signal processor 18. The field select control 20 operates to transmit therethrough to the luminance/chrominance encoder 22 each succeeding field of the moving image defining electronic information signals received from the video processor 18. The moving image defining electronic information signals are subsequently encoded to the standard luminance/chrominance format and thereafter transmitted by way of the multiplexer 34 for recording in the conventional manner as previously described.

As will be readily understood, the camera user composes the scene that he is recording by way of a conventional viewfinder (not shown). When the camera user sees a scene that he might like to record as a still image, he can do so by actuating the timing control 16 through a manual actuator 27. Actuation of the timing control in this manner operates to change the field select control circuit 20 to transmit through only alternate fields of the moving image defining electronic information signals to the luminance chrominance encoder 22. At the same time no further frames of electronic information signals are transmitted for storage in the buffer memory 26. The buffer memory 26 retains that frame of electronic information signals stored at the moment immediately following the camera user's actuation of the actuator 28. Thus, the frame of electronic information signals stored at that moment by the buffer memory 26 defines the still image that the camera user desires to record. The frame of still image defining electronic information signals is stored in its full resolution of 1,134 image sensing elements or pixels by 488 image sensing elements or pixels.

The still image defining electronic information signals for such a large number of image sensing elements cannot be transferred at standard field and frame rates without losing a substantial portion of the information due to the limitation in the frequency capabilities of conventional recording devices. Thus, in order to transfer substantially all of the still image defining electronic information signals stored by the buffer memory 26 there is provided a decimator 28 which operates to transfer portions of the still image defining electronic information signals stored by the buffer memory 26 at standard field or frame rates of 1/60th and 1/30th of a second, respectively.

Figure 3A:
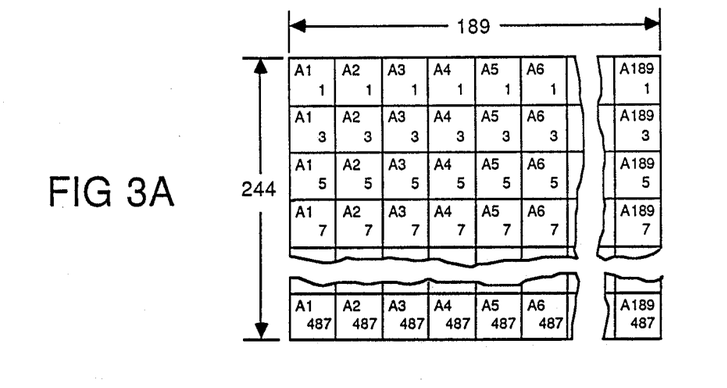
FIGS. 3A-3C are fragmentary plan views graphically illustrating the light sensing elements corresponding to the still image defining data of each of a plurality of succeeding still image data frames.
Figure 3B:
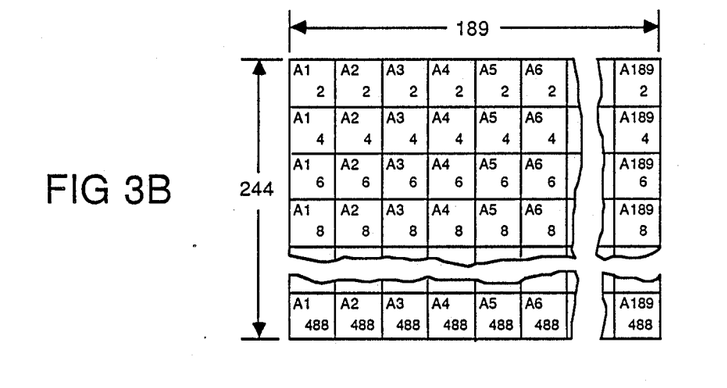
Figure 3C:
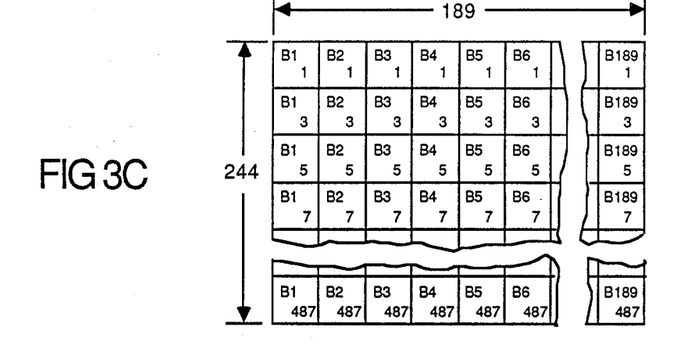

The still image defining electronic information signals retrieved from the buffer memory 26 by the decimator 28 for the first three alternate succeeding fields are shown in FIGS. 3A–3C, respectively. Thus, the first field of still image defining electronic information signals retrieved from the buffer memory 26 comprises electronic information signals corresponding to the pixels as shown in FIG. 3A. The field of FIG. 3A comprises electronic information signals corresponding to the image sensing elements from every sixth column and every other row of the full resolution frame of still image defining electronic information signals stored by the buffer memory 26. FIG. 3B shows the image sensing elements for which electronic information signals comprising the next succeeding field are transferred by the decimator 28 from the full resolution buffer memory 26. In like manner, FIG. 3C shows the image sensing elements for which electronic information signals for the third succeeding field are transferred by the decimator 28 from the full resolution buffer memory 26. Since the original full resolution image comprising 1,134 columns of picture sensing elements by 488 rows of picture sensing elements is decimated into fields comprising 1/12th the number of picture sensing elements, the still image defining electronic information signals are transferred at standard video frame and field rates within the frequency limitations of standard recording devices.

The still image defining electronic information signals from the decimator 28 are subsequently converted from their digital format to an analog format by a digital-to-analog converter 32 and thereafter transmitted to the multiplexer 34 to be multiplexed with the moving image defining electronic information signals output from the luminance/chrominance encoder 22.

Figures 4A, 4B:
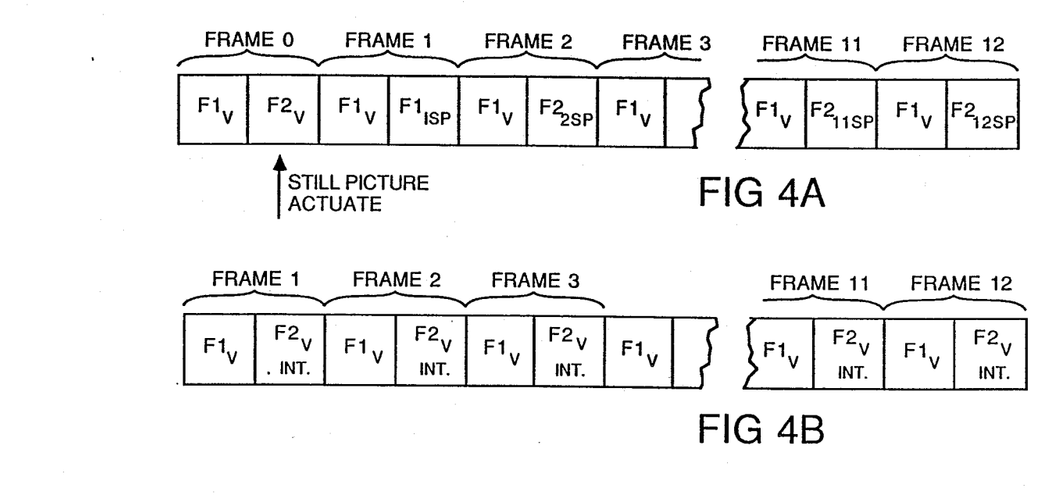
FIG. 4A is a graphical representation of succeeding frames of moving and still image defining data formatted in the manner of this invention.
FIG. 4B is a graphical representation showing succeeding fields and frames of moving image defining data deformatted in the manner of this invention.

The multiplexer 34 operates to multiplex alternate fields of the moving image defining electronic information signals with the succeeding frames of still image defining electronic information signals from the digital-to-analog converter 32 to provide an output electronic information signal having a field sequence as shown in FIG. 4A. The first frame 0 comprising the two succeeding fields $F1_v$ and $F2_v$ corresponds to the moving image defining electronic information signals output by the formatting circuit 10 of this invention prior to the manual actuation of the timing control 16 by the camera user to record a still image. Subsequent to the actuation by the camera user to record a still image, the next twelve succeeding frames each comprise a first field corresponding to the moving image defining electronic information signals detected by the image sensor 12 and a second field corresponding to one of the decimated portions of the full resolution still image defining electronic information signals stored in the buffer memory 26 at the instant of actuation. More specifically, the still image defining electronic information signals output in field $F2_{1SP}$ of frame 1 correspond to the image sensing pixels as shown in FIG. 3A. In like manner, the still image defining electronic information signals output in the second field $F2_{2SP}$ of frame 2 correspond to the image sensing elements as shown in FIG. 3B and so on. Thus, each of the second fields $F2_{1SP}$ through $F2_{12SP}$ define a select portion of the full resolution 1,134 pixel by 488 pixel still image. In this manner, the formatting circuit 10 of this invention provides upon selective actuation both moving image defining electronic information signals and high resolution still image defining electronic information signals interspersed in alternate fields wherein the plurality of succeeding alternate still image defining fields collectively define the high resolution still image.

Figure 5:
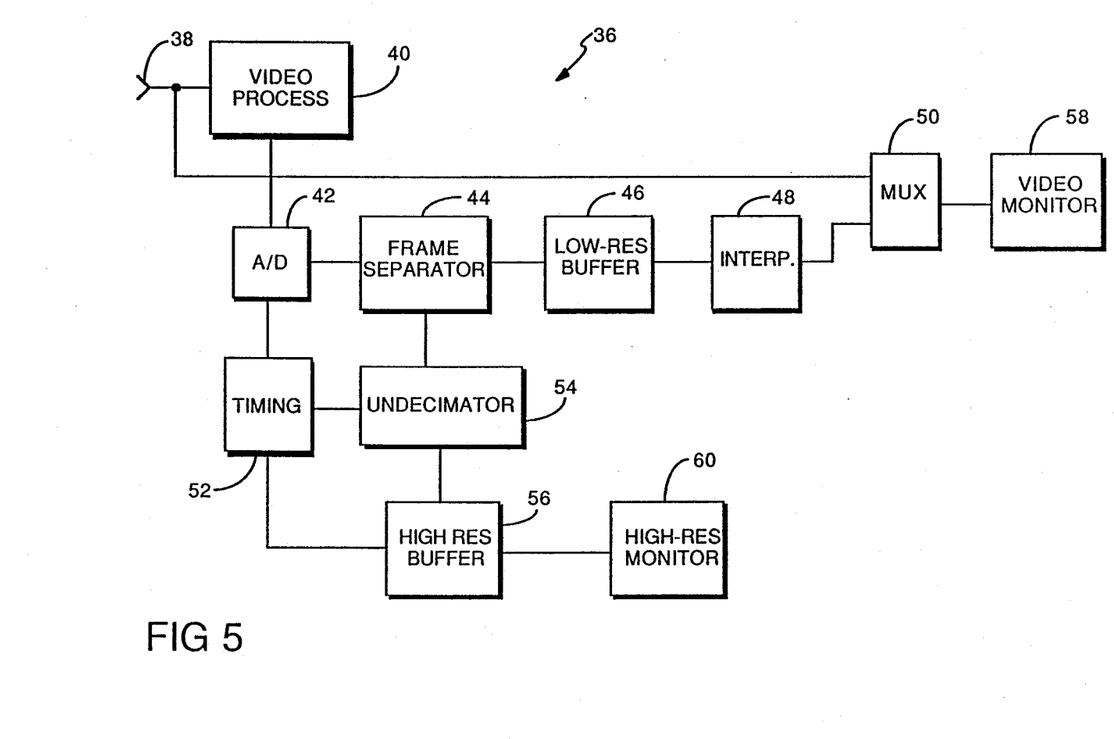
FIG. 5 is a schematic block diagram showing the deformatting circuit of this invention.

Referring now to FIG. 5, there is shown a schematic block diagram for a deformatting circuit 36 for deformatting the above-described electronic information signals to provide both continuous moving image defining electronic information signals during the interval at which the high resolution still image defining electronic information signals are recorded while also providing the still image defining electronic information signals. The electronic information signals recorded in the aforementioned manner are sensed in any conventional manner by a sensing head (not shown) and thereafter input by way of terminal 38 to a video processing circuit 40 which processes the electronic information signals in the aforementioned manner. The processed electronic information signals are thereafter converted from an analog format to a digital format by an analog-to-digital converter 42. The digitally formatted electronic information signals are thereafter directed to a frame separator 44 which operates to separate the alternate fields corresponding to the moving image defining electronic information signals and the still image defining electronic information signals.

As will be readily understood, a distinctive marker is preferably imposed on the first field of still image defining electronic information signals as shown at field $F2_{1SP}$ of frame 1 in FIG. 4A for subsequent recognition by the frame separator 44. The distinctive marker may comprise a distinctive set of pixel signals typically generated as the first set of scan lines of the first field of still image defining electronic information signals. In this manner, the frame separator 44 recognizes the interspersion of the still image defining electronic information signals with the moving image defining electronic information signals in the aforementioned format.

The frame separator 44 in response to recognition of the distinctive marker operates to transmit to a low resolution buffer 46 only the first field of each succeeding frame containing the moving image defining electronic information signals. Interpolator 48 thereafter operates to interpolate the moving image defining electronic information signals for the first field of each succeeding frame to derive values for a second field for each succeeding frame. The interpolated values for the second field of each succeeding frame are thereafter multiplexed by a multiplex circuit 50 with the originally sensed image defining electronic information signals to provide a conventional moving image defining electronic information signal as shown in FIG. 4B that may be played on a conventional video monitor 58. As is now readily apparent, the moving image defining electronic information signals may be played back continuously without interruption despite the selective interspersion of still image defining electronic information signals in the aforementioned manner. Since the second field of each succeeding frame of moving image defining electronic information signals must be interpolated, there is provided a slight decrease in the resolution of the moving image which should generally go unnoticed by the viewer in view of the short period of time during which the still image is recorded.

Figure 4C:
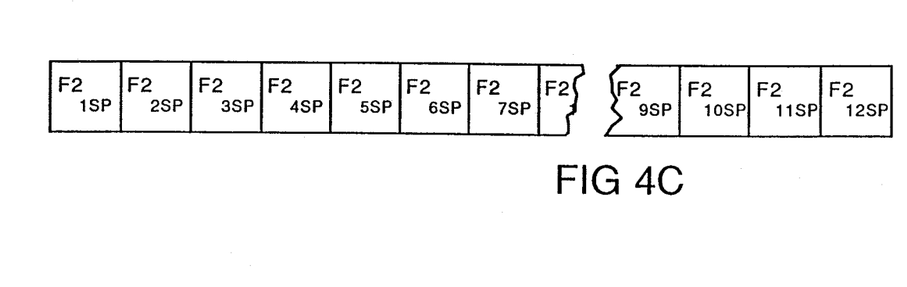
FIG. 4C is a graphical representation showing succeeding fields of high resolution still image defining data separated from the formatted signal of FIG. 4A in the manner of this invention.

Upon recognition of the aforementioned distinctive marker, the frame separator 44 also operates to direct the second fields $F2_{1SP}$–$F2_{12SP}$ of FIG. 4A for combination by an undecimator circuit 54. Thus, in this manner all the electronic information signals of the fields which define the high resolution still image are collectively undecimated and thereafter stored in buffer memory 56. The still image defining electronic information signals are undecimated as shown in FIG. 4C by the undecimator 54 and subsequently stored by the buffer memory 56 to provide a high resolution still image defining electronic image information signal which can be displayed on a high resolution monitor 60 or used to control any conventional high resolution still image hard copier (not shown). Thus, in this manner the deformatting circuit 36 can decode the aforementioned moving image defining electronic information signals interspersed with still image defining electronic information signals to provide a continuous uninterrupted moving image defining electronic information signal together with a separate high resolution still image defining electronic information signal. Both the moving and still image electronic information signals may be displayed simultaneously and individually at different monitors.

Figure 6:
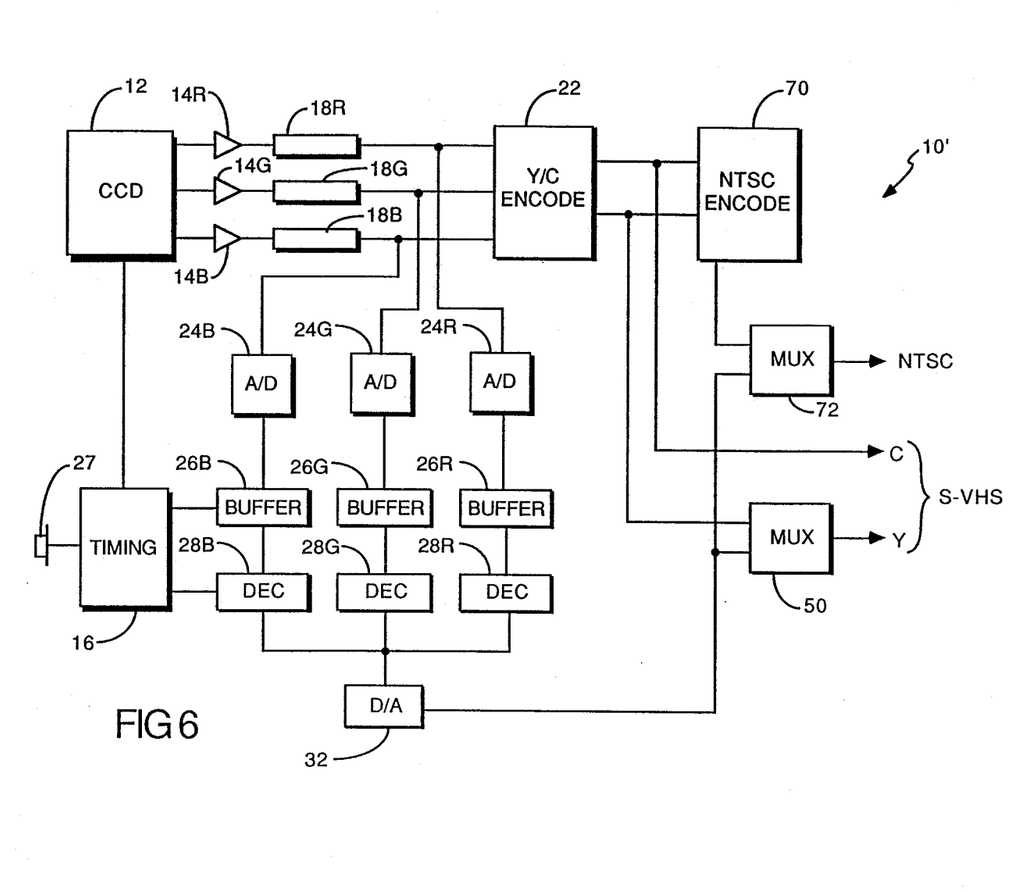
FIG. 6 is a schematic block diagram for an alternate preferred embodiment to the circuit of FIG. 1.

Referring now to FIG. 6 where like numerals reference previously described components there is shown an alternate preferred embodiment for the encoding circuit of FIG. 1. The CCD 12 preferably comprises various colored filter elements disposed over respective photosensitive elements of the array. The filter elements may be arranged in any well-known geometric pattern over the face of a photosensitive array 12 and may include red, green and blue filters as is well-known in the art. Thus, the CCD 12 provides image defining electronic information signals in three channels corresponding to the red, green and blue color components, respectively. Each of the channels comprises its own respective amplifier 14R, 14G and 14B and its own respective video processor circuit 18R, 18G and 18B. Each color component channel also, in turn, comprises its own analog-to-digital converter 24R, 24G, and 24B; its own respective buffer memory 26R, 26G, and 26B, and its own respective decimator 28R, 28G, and 28B. The decimated color components of the high resolution still image electronic information signals are ultimately converted to an analog format by common digital-to-analog converter 32. The decimated still image defining electronic information signals are subsequently multiplexed by the multiplexer 50 with the luminance portion of the moving image defining electronic information signals to provide a composite luminance signal which in combination with the chrominance moving image electronic information signal is suitable for recording and playback on a super VHS formatted recorder. The moving image defining luminance and chrominance electronic information signals may also be subsequently encoded into an NTSC format by an encoder circuit 70 and multiplexed by a multiplexer 72 with the decimated still image defining electronic information signals to provide an output signal in NTSC format that is suitable for recording and playback in any conventional VHS formatted recorder.

Figure 7:
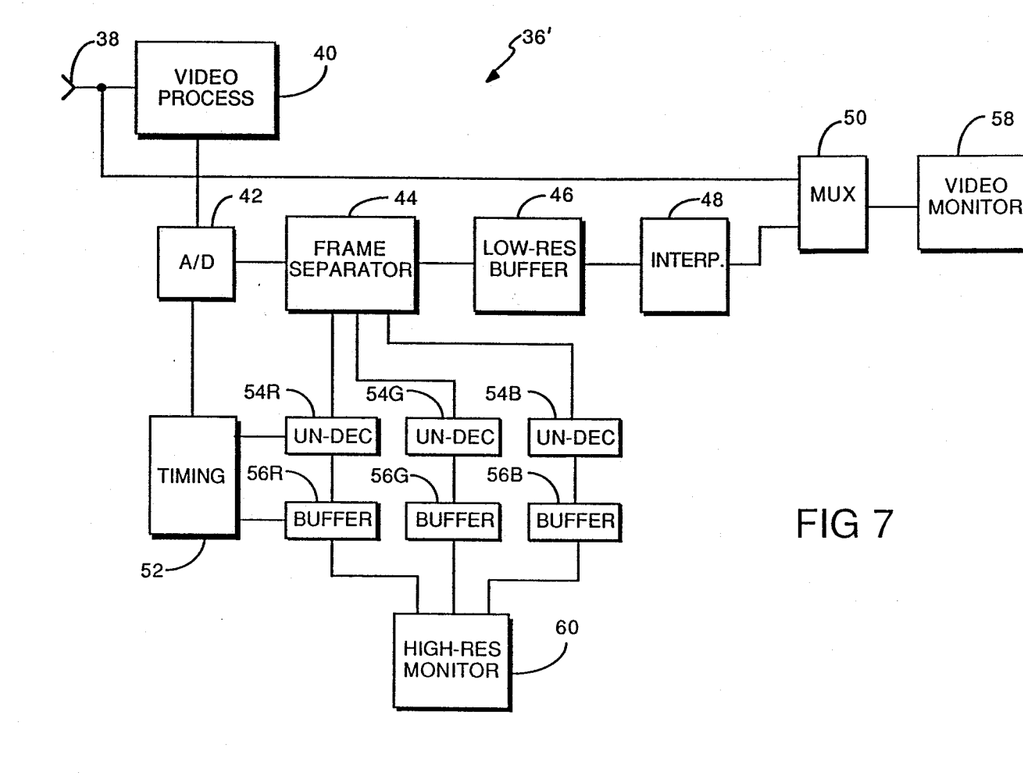
FIG. 7 is a schematic block diagram for an alternate preferred embodiment to the circuit of FIG. 5.

Referring now to FIG. 7 where like numerals designate previously-described elements, there is shown a schematic block diagram for an alternate preferred embodiment for the deformatting circuit of FIG. 5 for deformatting the multicolor component signal encoded by the circuit of FIG. 6. The frame separator circuit 44 outputs the still image defining electronic information signals in their respective red, green and blue color components to each of three red, green and blue color component channels. The color component channels, in turn, comprise red, green and blue undecimator circuits 54R, 54G, and 54B, which connect, respectively, to buffer memory circuits 56R, 56G, and 56B. The deformatting circuit of FIG. 7 operates in the aforementioned manner with each of the color component channels processing its own respective color. By way of example, the A and D columns of the image sensing array 12 of FIG. 2 may be overlayed with red filters, the B and E columns may be overlayed with green filters and the C and F columns may be overlayed with blue filters. It will be readily understood that other color filter stripe patterns may alternatively be used.

Other embodiments of the invention, including additions, subtractions, deletions and other modifications of the preferred disclosed embodiments of the invention will be obvious to those skilled in the art and are within the scope of the following claims.

What is claimed is:

1. Apparatus for formatting high resolution still image electronic information signals and moving image electronic information signals of a type which can be provided from an image sensor at standard video frame and field rates for integration with respect to each other, said apparatus comprising:

means for receiving the moving image electronic information signals from the sensor at the standard video frame and field rate;

means for storing electronic information signals; and control means for transmitting each succeeding frame of the received moving image electronic information for temporary storage within said storage means, said control means also operating to encode the received moving image electronic information signals into a standard video format and output the encoded moving image electronic information signals at the standard video frame and field rate, said control means responding to the selective actuation thereof by outputting only alternate fields of the encoded moving image electronic information signals, while simultaneously outputting from said storage means select portions of the frame of electronic information signals stored by said storing means following said selective actuation, at intervals corresponding to the intervals between said alternate fields of the encoded moving image electronic information signals, said select portions collectively comprising still image electronic information signals which define a still image.

2. The apparatus of claim 1 wherein said control means includes means for multiplexing said alternate fields of said moving image electronic information signals with said select portions from said stored frame of still image electronic information signals.

3. The apparatus of claim 2 wherein said storage means comprises a buffer memory and said control means comprises a decimator for outputting from said buffer memory selectly decimated portions of the frame of electronic information signals stored by said buffer memory.

4. The apparatus of claim 3 including an analog-to-digital converter for converting each frame of electronic information signals from an analog format to a digital format prior to storage within said buffer memory and a digital-to-analog converter for converting said selectly decimated portions from the stored frame of electronic information signals from its digital format back to an analog format.

5. The apparatus of claim 3 wherein said control means includes a luminance/chrominance encoder for encoding the moving image electronic information signals into a standard luminance/chrominance format said multiplexer operating to multiplex said luminance formatted portion of the moving image electronic information signals with said decimated portions from said stored frame of still image electronic information signals.

6. The apparatus of claim 5 wherein said control means further includes an NTSC encoder for encoding the moving electronic information signals into a standard NTSC format and a second multiplexer for multiplexing said alternate fields of said NTSC encoded moving image electronic information signals with said decimated portion from said stored frame of still image electronic information signals.

7. The apparatus of claim 2 wherein: the moving image electronic information signals includes at least three color components corresponding, respectively, to one of three different primary colors, said receiving means comprises at least three channels each of which receives a different one of the color components of the moving image electronic information signals, said storing means comprises at least three buffer memories each storing a different one of the color components of the moving image electronic information signals, and said control means operates to output from each of said buffer memories select portions of the frame for the color component of the electronic information signals stored therein.

8. A method for formatting high resolution still image electronic information signals and moving image electronic information signals of a type which can be provided from an image sensor at standard video frame and field rates for integration with respect to each other comprising the steps of:

storing each succeeding frame of the moving image electronic information signal;

transmitting only alternate fields of the moving image electronic information signals; and transmitting select portions of the stored frame of electronic information signals at intervals corresponding to the intervals between the alternate fields of the moving image electronic information signals, said select portions collectively comprising still image electronic information signals which define a still image.

9. The method of claim 8 further including the step of multiplexing the alternate fields of the moving image electronic information signals with the select portions from the stored frame of still image electronic information signals.

10. The method of claim 9 further including the steps of selectively determining when to transmit and multiplex alternate fields of the moving image electronic information signals with the select portions from the stored frame of electronic information signals and prior to said selective determination, transmitting all the fields of the moving image electronic image information signals while not transmitting any of the select portions of the stored frames of electronic information signals.

11. The method of claim 10 wherein: the moving image electronic information signal includes at least three color components corresponding to one of three different primary colors, said storing step includes storing a different one of the color components of the moving image electronic information signals, and said transmitting step includes transmitting select portions of the frame for each color component of the stored electronic information signals.

12. The method of claim 10 wherein the step of transmitting select portions of the stored frame includes selectively decimating said stored frame.

13. The method of claim 12 including the steps of converting each frame of electronic information signals from an analog format to a digital format prior to storing, and converting said selectively decimated portions of electronic information signals from its digital format back to an analog format.

14. The method of claim 12 including the steps of encoding the moving image electronic information signals into a standard luminance/chrominance format prior to transmittance, said multiplexing step operating to multiplex the luminance formatted portion of the moving image electronic information signals with the selectively decimated portions from the stored frame of still image electronic information signals.

15. The method of claim 14 including the steps of encoding the moving image electronic information signals into a standard NTSC format and multiplexing the alternate fields of the NTSC formatted moving image electronic information signals with the selectively decimated portion from the stored frame of still image electronic information signals.

* * * * *